United States Patent [19]

Link et al.

[11] Patent Number: 4,711,467

[45] Date of Patent: Dec. 8, 1987

[54] METHOD AND MEANS FOR LIFT TRUCK ASSEMBLY AND SERVICING

[75] Inventors: David H. Link; Juan R. Lopez, both of Battle Creek, Mich.

[73] Assignee: Clark Equipment Company, South Bend, Ind.

[21] Appl. No.: 934,519

[22] Filed: Nov. 24, 1986

Related U.S. Application Data

[63] Continuation-in-part of Ser. No. 818,569, Jan. 13, 1986, abandoned.

[51] Int. Cl.[4] ...................... B62D 21/12; B21D 39/00; B23P 11/00

[52] U.S. Cl. ...................................... 280/785; 29/430; 29/822; 180/312; 296/196

[58] Field of Search ................. 29/428, 430, 822, 823, 29/824; 180/311, 312; 280/785; 296/196, 197; 414/539, 540, 541, 544

[56] References Cited

U.S. PATENT DOCUMENTS

| | | | |
|---|---|---|---|
| 4,342,470 | 8/1982 | Matsuda | 280/785 |
| 4,594,764 | 6/1986 | Yamamoto | 29/430 |
| 4,604,797 | 8/1986 | Kitamura et al. | 29/430 X |

*Primary Examiner*—Howard N. Goldberg
*Assistant Examiner*—Ronald S. Wallace
*Attorney, Agent, or Firm*—John C. Wiessler

[57] ABSTRACT

A material handling truck utilizing a transverse frame plate on which a plurality of operating components are sub-assembled, which sub-assembly is transported to a selected assembly station on the main assembly line at which it is secured, as by bolting, transversely of the frame of the truck and functions as a structural member thereof. In the example of a sit-down rider electric truck the sub-assembled frame plate may also be mounted for pivoting when the connections, such as bolts, are removed; thereby facilitating truck servicing, as well as functioning when in rigid connection with the frame as a battery retainer plate.

18 Claims, 6 Drawing Figures

METHOD AND MEANS FOR LIFT TRUCK ASSEMBLY AND SERVICING

CROSS-REFERENCE TO RELATED APPLICATION

This is a continuation-in-part of application Ser. No. 06/818,569 filed Jan. 13, 1986, now abandoned.

BACKGROUND OF THE INVENTION

Heretofore in the manufacture of materials handling trucks, such as lift trucks, particularly of the sit-down rider type, it has been customary to first construct an all-welded rigid frame in and on which along a relatively long assembly line numerous operating components including electrical and hydraulic systems are assembled, which together produce at the end of the line an operable truck.

As is common in such assembly operations one or more components are mounted in and on the rigid frame at each of many stations along the assembly line and interconnected as required as by electrical cables and hydraulic conduits to effect an operable vehicle.

In the case of sit-down electric lift trucks all components required to effect an operable vehicle are assembled as the frame traverses the assembly line except only the main drive or traction battery which is ordinarily installed at a dealer's location because of the weight and bulk of the battery which otherwise would have to be shipped with the truck. Assembly line test batteries may be installed at the end of the line during inspection and testing of the correct performance characteristics of the truck.

In addition, after market servicing of such trucks has been relatively difficult because of the compact packaging of components forwardly of the drive battery section.

SUMMARY OF THE INVENTION

The principal object of the present invention is to significantly reduce the time and space required for assembly by performing sub-assembly of a number of major lift truck components on a transverse frame member at a location different from the main assembly line, transporting the sub-assembled components and frame plate to a certain station of the assembly line, and locating the sub-assembly in and connecting it to the truck frame. Alternatively, certain components can be preassembled on said frame member at a selected station on or off the main assembly line while other components are assembled in the main frame at one or more assembly line stations, and the frame member sub-assembly is then located in and connected to the main frame.

In an electric lift truck, for example, the sub-assembly frame plate may double as both a battery retainer plate and a structural member of the truck. It may be connected to the truck frame by bolts to hold it in rigid relationship thereto, except when servicing is required in the after-market. The invention provides pivot pins in the frame on which the plate of the sub-assembly is mounted, in addition to the bolting connection thereof to the frame, whereby removal of the bolts permits the entire sub-assembly to be pivoted rearwardly upon removal of the battery from the battery compartment whereby the majority of operating components of the truck are exposed for easy access and servicing.

From the foregoing it will be understood that by using our method of manufacture and assembly the conventional time and space required for assembly are both significantly reduced and, in the use of the pivoted frame plate, serviceability and access to truck components are greatly enhanced.

DESCRIPTION OF THE PREFERRED EMBODIMENT

Figure 1:
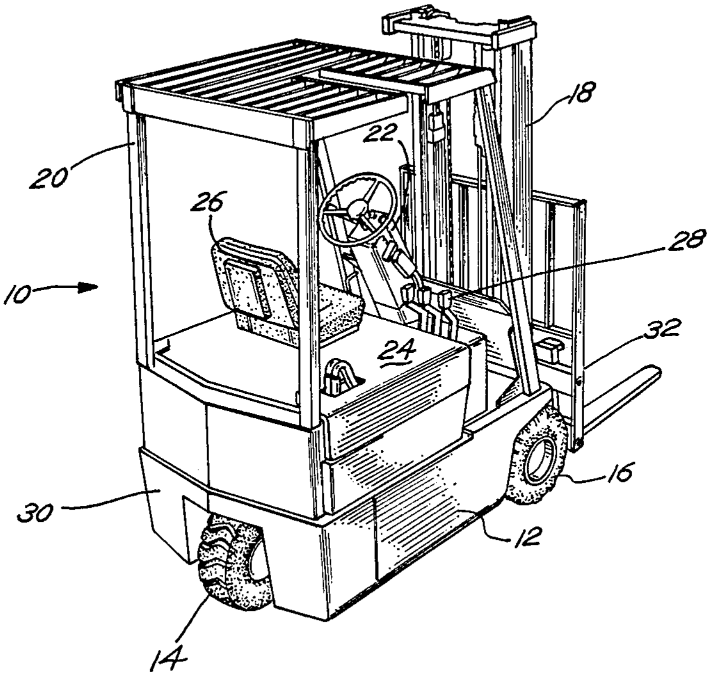
FIG. 1 is a perspective view of an electric lift truck utilizing the present invention.

Referring first to FIG. 1, a lift truck is shown at numeral 10 having a frame and body construction 12, a single center-mounted steer wheel 14 at the rear of the truck, a pair of traction wheels 16 at the forward end, an upright assembly 18, an overhead guard assembly 20, a battery and drive component compartment mounted centrally of the truck, an operator's steering wheel and pylon 22, a rearwardly pivotal box-like hood device 24 having mounted thereon on operator's seat 26, foot and hand operated controls including three control valve levers 28, a counterweight assembly 30, and a fork carriage assembly 32 mounted for elevation on upright 18.

Figure 2:
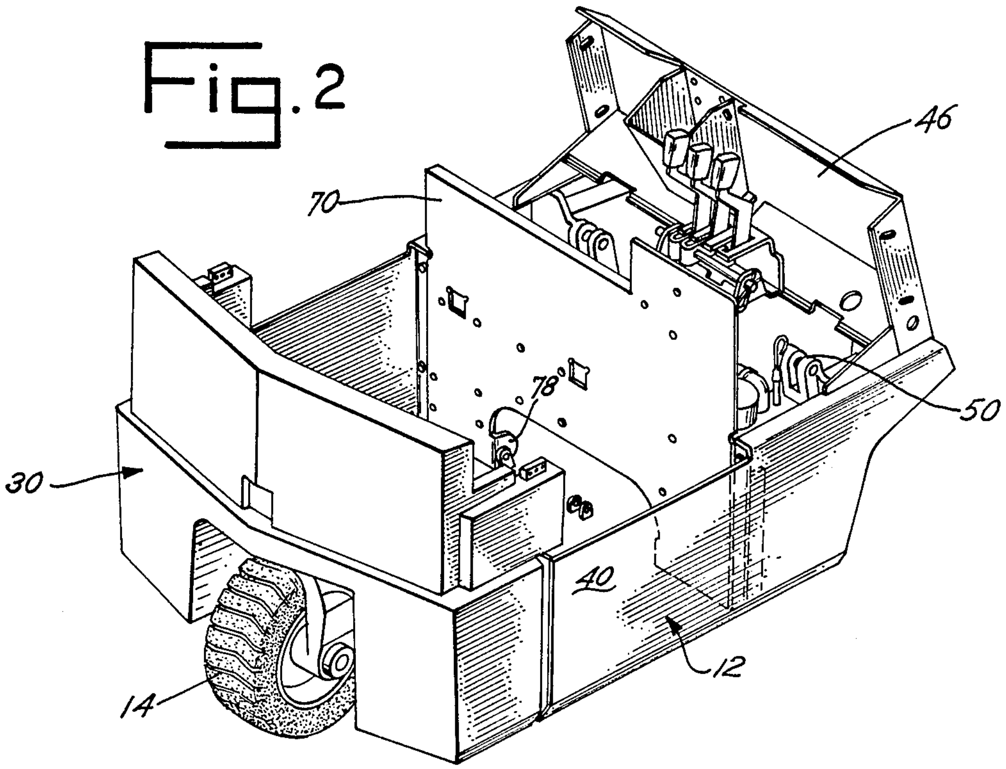
FIG. 2 is a perspective view of an assembled lift truck frame having assembled therein the sub-assembled frame plate of this invention.
Figure 3:
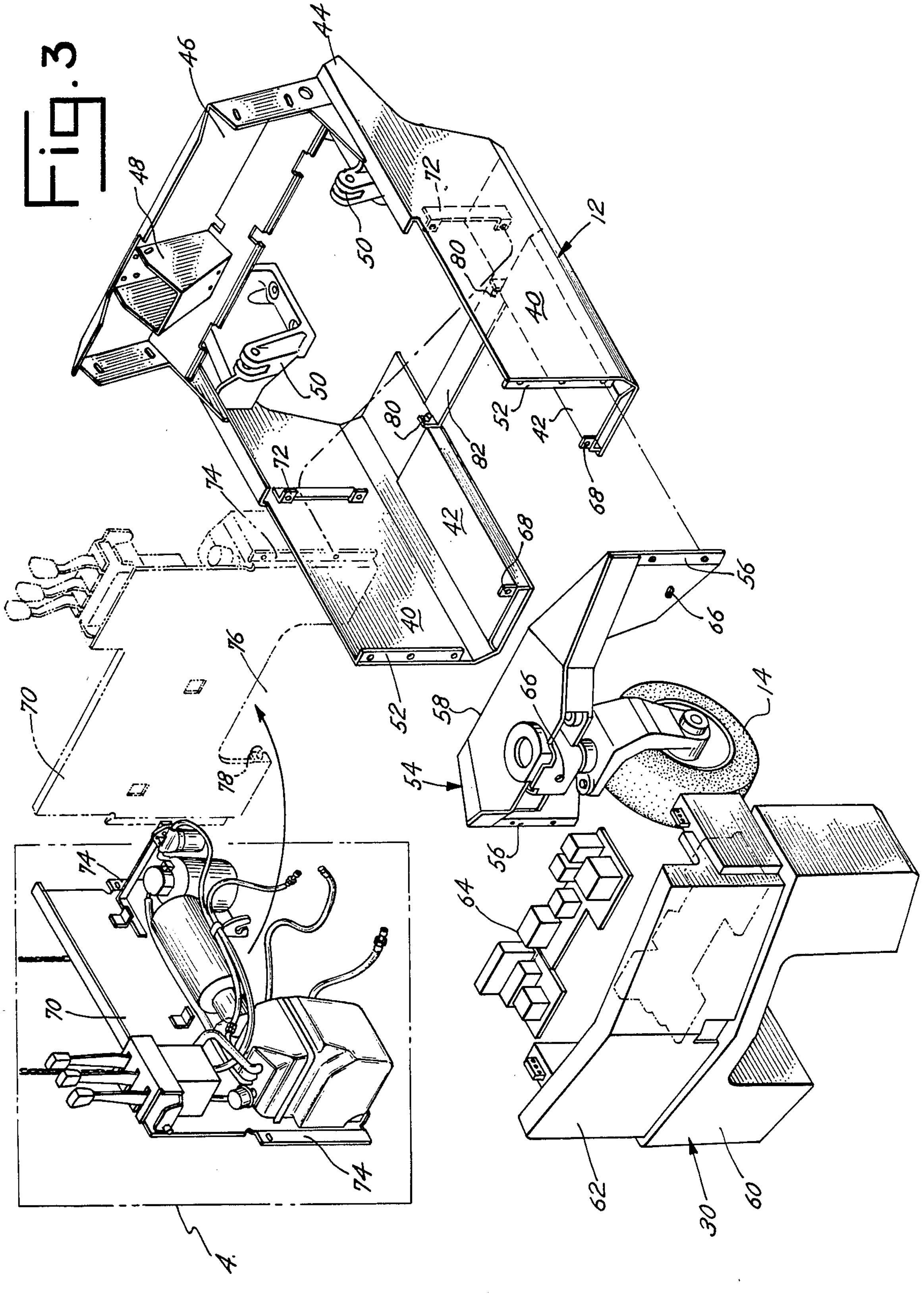
FIG. 3 is an exploded view of FIG. 2 showing in perspective front and rear views of the sub-assembled frame plate.

Referring now to FIGS. 2 and 3, frame 12 comprises a pair of side plates 40 having inwardly turned horizontal flange portions 42 and formed as shown at the forward ends 44 to provide wells for traction wheels 16. A cowling 46 extends across and is suitably secured to the upper portion of frame members 40 and includes a cover and box-section 48 for mounting the pivotable steering wheel and pylon 22. A pair of upright tilt cylinder anchor bracket means 50 are mounted inwardly of the forward end portion of the frame as shown.

The frame 12 comprises an all welded construction. Secured thereto, as by welding, are a pair of mounting strips 52 at the rear end adapted to be secured, as by a plurality of bolts, to a steer wheel assembly 54 having corresponding mounting strips 56 at its opposite sides. The forward surface 58 of wheel assembly 54 functions as a rear battery retainer plate.

Counterweight assembly 30 comprises upper and lower counterweight portions 60 and 62 and an SCR control assembly 64 shown in FIG. 3 in solid lines in a raised position ready for mounting and in broken lines in a mounted position on the lower counterweight portion 60. The counterweight assembly is adapted to be secured to the steering assembly 54 at three bolt-hole locations, two of which are shown at 66, and to a pair of brackets 68 on side frame portions 42 which are concentric with side openings 66 and with corresponding openings, not shown, in the interior of the counterweight assembly. Connecting bolts extend through the three pairs of openings.

A sub-assembly frame plate 70 is adapted to be mounted in frame 12 transversely of side plates 40 by means of connections, such as bolts, between pairs of frame brackets 72 and plate brackets 74. At the lower corners of a plate cut-out portion 76 are located a pair of forwardly extending pivot brackets 78 which are adapted to engage a pair of inwardly extending pivot pins 80 which are mounted from a transverse member 82 extending between side plate portions 42, pivotal engagement and support being effected between brackets 78 and pins 80 when plate 70 is mounted in frame 12, from which position the plate may be secured by brackets 74 to brackets 72, or, when disengaged from brackets 72, may be pivoted rearwardly on pins 80 as shown in FIG. 5.

Figure 5:
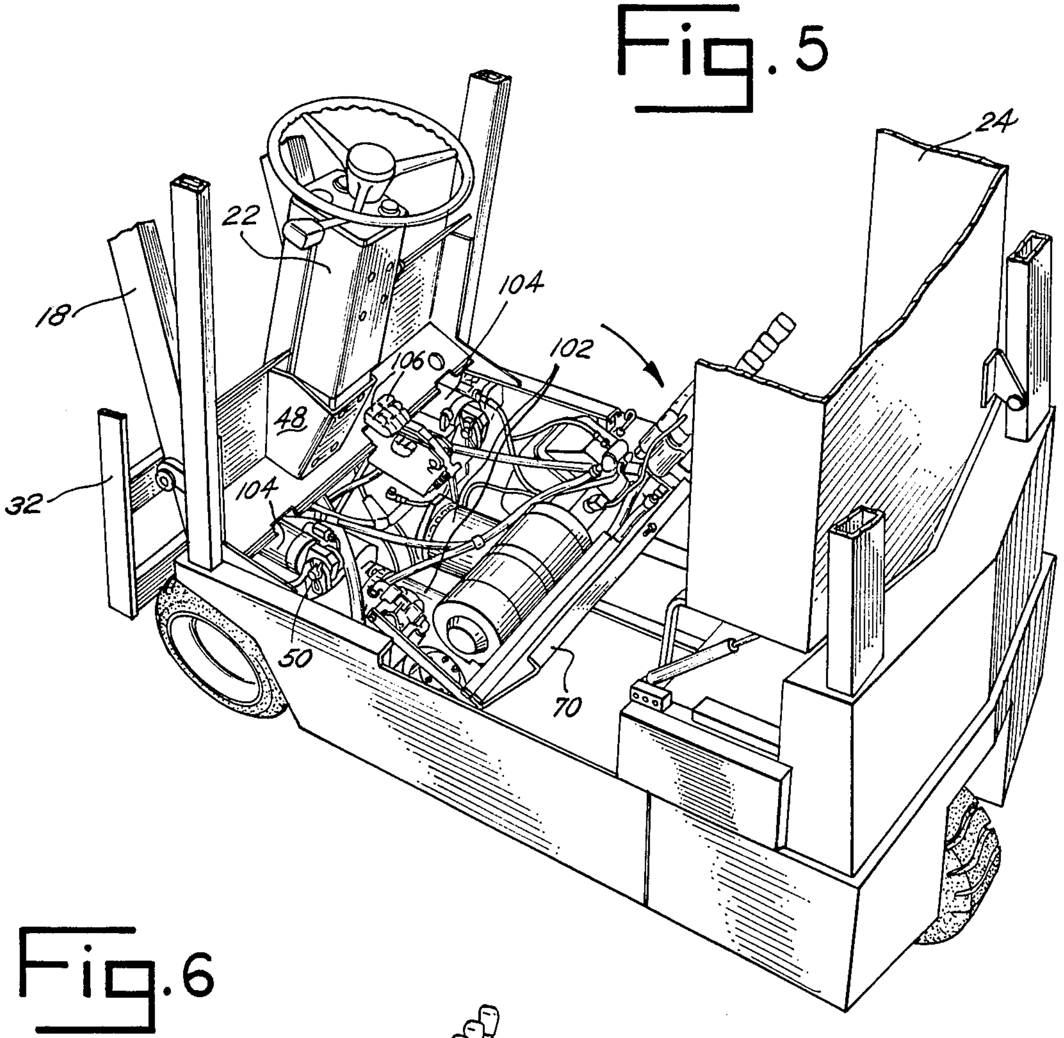
FIG. 5 is a perspective view of the lift truck showing a complete assembly of certain operating components and with the sub-assembled frame plate pivoted rearwardly of the truck with the drive battery removed and the cover hood raised for providing ready access to the operating components.

Plate 70 functions both as a forward battery retainer plate for a drive or traction battery 82 and as a structural frame member when secured in position (FIG. 6); when it is disconnected from brackets 72 and when the battery 82 is removed from the truck plate 70 may be pivoted rearwardly on pins 80 for enabling ready access to and servicing of the various truck operating components mounted within the frame portion forwardly of plate 70 as well as those components located on plate 70 (FIG. 5).

Figure 4:
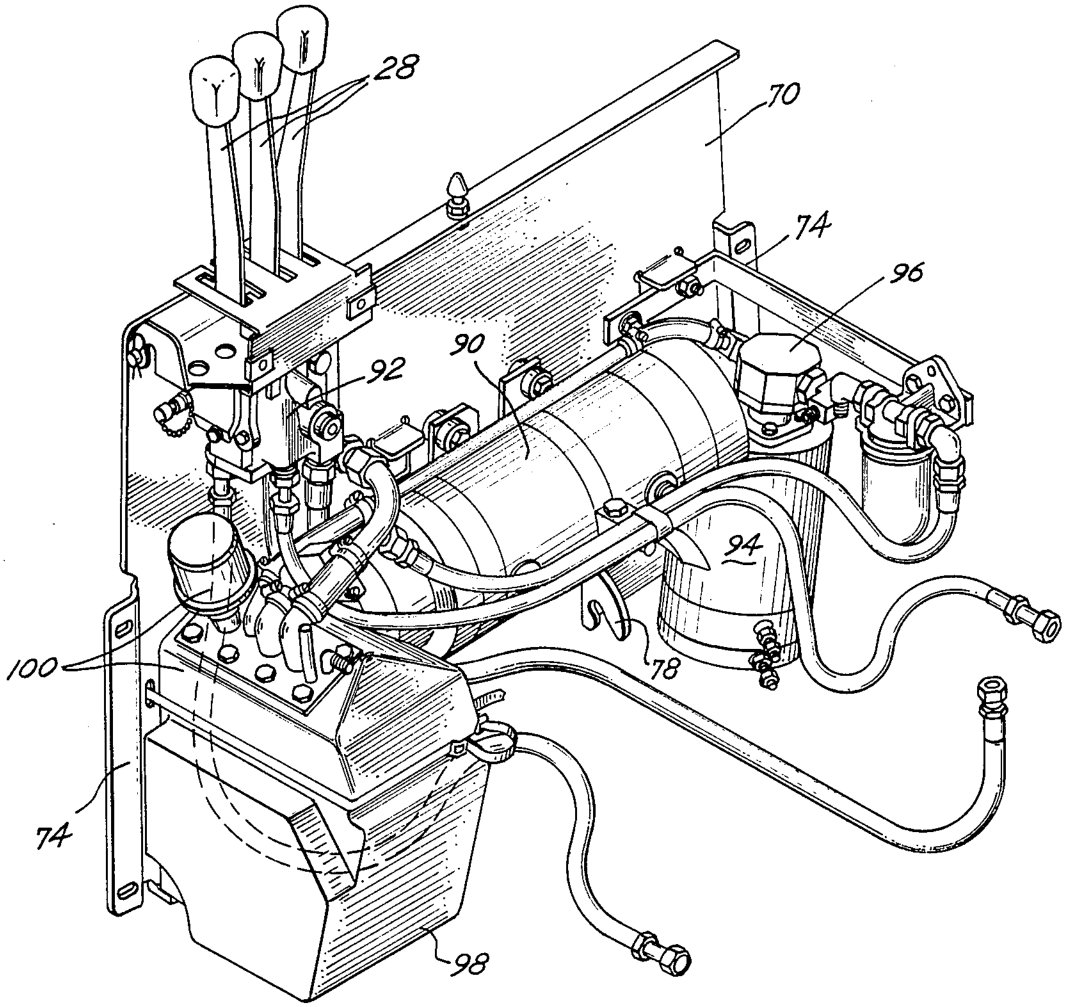
FIG. 4 is an enlarged view in perspective of the sub-assembled frame plate showing various truck operating components secured to the front side thereof.

As best shown in FIG. 4 plate 70 is adapted to have mounted thereon at a sub-assembly station remote from the main truck assembly line, or alternatively at a sub-assembly station on the assembly line, a plurality of operating components including, as shown, an upright hydraulic lift pump and motor assembly 90, a multiple spool control valve 92, the valve spools of which are operated by operator control levers 28 to perform various hydraulic functions, a steer motor and pump assembly 94, a hydraulic fluid filter 96, a hydraulic fluid sump, cover and breather 98,100, and a plurality of suitably connecting hydraulic conduits, as shown. The conduits are connected between sump assembly 98 and the various plate mounted components and are adapted to be connected at the free ends thereof to various truck operating components such as the steering assembly and the upright lift and tilt cylinders when the plate 70 assembly is secured in frame 12. Of course, the particular components disclosed as mounted on plate 70 are for illustrative purposes only. The particular components and arrangement of components on plate 70 are optional with the manufacturer depending upon the specifics of each truck design.

Figure 6:
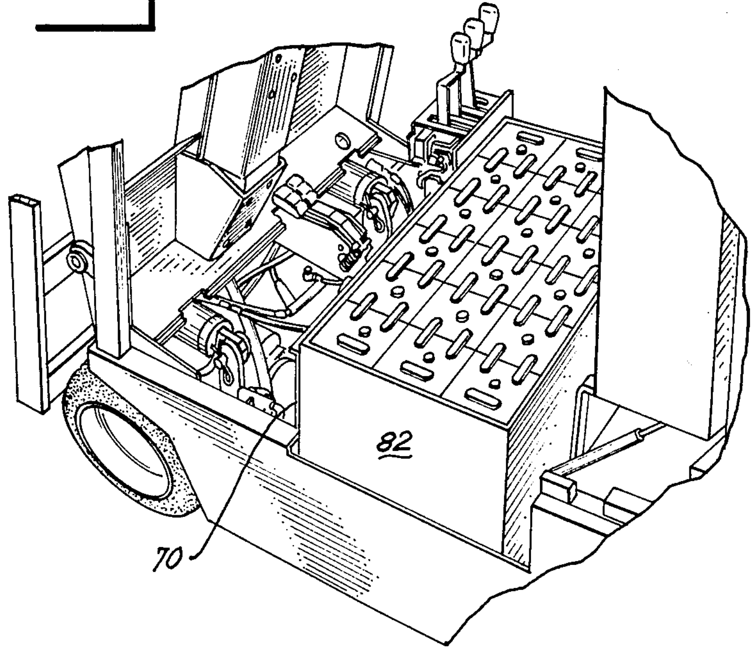
FIG. 6 is a partial view of the truck in FIG. 5 with the sub-assembled frame plate pivoted to an upright position and secured to the truck frame and with the drive or traction battery installed.

As shown in FIGS. 5 and 6, a plurality of other operating components are mounted in the forward frame section of the truck including a pair of electric traction motors 102 mounted to drive traction wheels 16, a pair of upright tilt cylinders 104, operator pedal controls 106, and others which need not be detailed here. An operator's floor plate is removed in FIGS. 5 and 6 so that the relationship of the various components can be observed.

An exemplary assembly process in the manufacture of a lift truck utilizing our invention may be as follows:

A main frame structure 12 is first located at one end of an assembly line at the first station of which the drive motor and axle assembly, as well as electrical cables and harnesses therefor are assembled in the forward end of the frame. This assembly includes drive motors 102, a drive axle, and related parts. At subsequent stations a plurality of additional components are assembled on or in the frame including power steering components, not shown, the steering assembly 54, upright and tilt cylinders and conduits, the operator pedal assembly, and the steering pylon assembly 22.

Subsequent to the above assembly process it has been found convenient to mount in frame 12 the plate assembly 70 to which has been pre-assembled at a station remote from the main assembly line the various components such as described above. If desired such components may be tested conveniently at the remote assembly station, as by bench tests, prior to the transporting thereof, such as by an overhead crane, to the selected station on the main assembly line at which the plate assembly is mounted in frame 12 on pins 80 and brackets 72. The various hydraulic conduits associated with the plate assembly as shown in the figures are then preferably connected to the respective truck operating components.

Subsequent to the mounting of plate assembly 70 in frame 12 additional truck parts and components are assembled at subsequent stations, such as the counterweight and SCR control assembly 30,64, and the necessary plugs and cables for connection to a test drive battery which may be installed for subsequent functional testing of the various hydraulic and electrical components prior to shipment of the truck. The upright 18 and traction wheels 16 may then be installed, after which the hood and overhead guard assemblies 20 and 24 may be installed along with plate covers, the operator seat, and the like. Battery 82 is normally installed at a later date, such as at a distributor or end user location following shipment of the truck, so as to avoid the weight and bulk of shipment thereof from the factory.

The above assembly process has been found to eliminate five assembly stations on the main assembly line, thereby significantly shortening the line, speeding up the assembly process by pre-assembly of the FIG. 4 sub-assembly for installation thereof at a single station on the line, and affording the opportunity to bench test, for example, the components mounted on plate 70 prior to assembly in the truck frame.

Alternatively, although not preferably, the entire main frame assembly may take place at one or more assembly line stations while the frame plate sub-assembly may take place at a selected assembly line station which may be coordinated with one or more main frame assembly stations in the mounting of the frame plate sub-assembly in the main frame.

Our invention significantly reduces the cost and time and space requirements for lift truck assembly. It further has the important after-market advantage of providing easy access to most major truck components by providing for the pivotal mounting of plate 70 along with the components mounted thereon so as to "open up" the front frame portion of the truck which houses various other truck components. Thus, easy access for the subsequent servicing and replacement of various components as may be required is provided. This latter advantage is best shown in FIG. 5 wherein the battery 82 has been removed from the truck and the plate assembly 70 has been pivoted rearwardly with the floor plate removed and hood and seat assembly 24,26 raised.

Although we have described and illustrated a preferred embodiment of our invention, it will be understood by those skilled in the art that modifications may be made in the structure, form, and relative arrangement of parts without departing from the spirit and scope of the invention. Accordingly, it should be understood that we intend to cover by the appended claims all such modifications which fall within the scope of our invention.

We claim:

1. A method of manufacturing lift trucks comprising the steps of moving a truck main frame from station to station along an assembly line at each of which stations one or more truck parts or assemblies is assembled on the frame, mounting on a main frame plate means remote from the assembly line a plurality of truck components, transporting to the assembly line at a preselected station thereof said main frame plate means, and mounting in the truck frame said main frame plate means with said truck components which are mounted thereon.

2. A method of manufacturing lift trucks comprising the steps of assembling in a truck main frame one or more truck parts or assemblies, mounting a plurality of truck components on a main frame plate means at a location different from the location of the main frame assembly, transporting said plate means to an assembly location of said main frame, and mounting in the truck main frame said frame plate means with said truck components which are mounted thereon.

3. A method as claimed in claims 1 or 2 comprising the additional step of securing rigidly the main frame plate means transversely of the main frame so that it functions as a structural frame member.

4. A method as claimed in claim 3 wherein said main frame plate means also functions as a battery retainer plate means of an electric lift truck.

5. A method as claimed in claim 3 comprising the additional step of mounting said main frame plate means for subsequent pivotal movement relative to the main frame upon detachment of the frame plate means from its rigid connection to the main frame.

6. A method as claimed in claim 3 wherein pivotal movement of the main frame plate means provides ready access for servicing of the truck components which are mounted on the frame plate means and to other truck components mounted in the main frame and further exposed for servicing by such pivotal movement of the frame plate means.

7. A method as claimed in claims 1 or 2 wherein the truck components mounted on the main frame plate means include a lift pump and motor assembly, a main control valve assembly and a steer motor and pump assembly.

8. A method as claimed in claim 3 comprising the additional step of mounting drive battery means in the main frame subsequent to the mounting of the main frame plate means therein such that the battery means is adapted to abut the frame plate means.

9. A method as claimed in claims 1 or 2 comprising the additional step of securing rigidly the main frame plate means transversely of the main frame so that it functions as a battery retainer plate means of an electric lift truck.

10. A method as claimed in claim 3 wherein truck parts assembled in the main frame include the mounting of a traction drive unit assembly in the forward end portion of said frame, the mounting of a steer unit assembly across the rear portion of said frame and the mounting of a counterweight assembly adjacent the rear portion of said frame.

11. A method as claimed in claim 10 wherein components assembled on said frame plate means include a lift pump and motor assembly, a main control valve assembly and a steer motor and pump assembly.

12. A lift truck comprising a main frame, a main frame plate means adapted to be secured to the main frame generally centrally and transversely thereof, a plurality of truck components mounted on said frame plate means, said main frame plate means being disconnectable from rigid connection with said main frame, and pivot means connecting said frame plate means to said main frame such that when disconnected said frame plate means may be pivoted in a predetermined direction.

13. A lift truck as claimed in claim 12 wherein components mounted on said main frame plate means include a lift pump and motor assembly, a steer pump and motor assembly, and a control valve assembly.

14. A lift truck as claimed in claim 12 wherein said components are assembled on said main frame plate means at a predetermined location and transported to a main frame assembly station for mounting in the lift truck.

15. A lift truck as claimed in claim 12 wherein a plurality of additional truck components are assembled in said main frame forwardly of said main frame plate means, said components on said frame plate means and said additional components being exposed for ready access and servicing when said main frame plate means is pivoted in said main frame.

16. A lift truck as claimed in claim 12 wherein a drive battery is mounted in said main frame rearwardly of said main frame plate means, said battery being removed therefrom when said frame plate means is to be pivoted rearwardly of the main frame for enabling ready access for servicing of truck components mounted both on said frame plate means and mounted in the truck frame forwardly of said frame plate means.

17. A lift truck as claimed in claim 12 wherein said main frame plate means functions when in rigid connected relationship to said main frame both as a structural member of said main frame and as a drive battery retainer plate.

18. A lift truck as claimed in claim 12 wherein said truck components are mounted on the forward side of said plate means, said plate means being pivotable in a rearward direction.

* * * * *